(12) United States Patent
Thiele

(10) Patent No.: US 6,391,363 B1
(45) Date of Patent: May 21, 2002

(54) METHOD FOR PRODUCING A BAKED SHAPED BODY

(76) Inventor: Marion Thiele, Barensteiner Strasse 16-18, D-01277 Dresden (DE)

(*) Notice: Subject to any disclaimer, the term of this patent is extended or adjusted under 35 U.S.C. 154(b) by 0 days.

(21) Appl. No.: 09/659,447

(22) Filed: Sep. 11, 2000

(30) Foreign Application Priority Data

Sep. 10, 1999 (DE) .......................................... 199 43 239

(51) Int. Cl.[7] .................................................. A21D 8/00
(52) U.S. Cl. ........................ 426/523; 426/496; 426/512
(58) Field of Search ................................. 426/496, 523, 426/139, 512; 99/383, 442

(56) References Cited

U.S. PATENT DOCUMENTS

| 2,111,021 A | | 3/1938 | Bemis | 426/94 |
| 5,405,627 A | | 4/1995 | Ito | 426/94 |
| 5,693,355 A | * | 12/1997 | Haas | 426/523 |

FOREIGN PATENT DOCUMENTS

| AT | 335940 | 4/1977 |
| DE | 2841398 | 4/1979 |
| DE | 19646752 | 11/1997 |

* cited by examiner

*Primary Examiner*—George C. Yeung
(74) *Attorney, Agent, or Firm*—Baker Botts LLP

(57) ABSTRACT

The present invention relates to a method and pressing mold for producing a baked shaped body using a non-liquid dough blank prepared from grain flour. The method includes the steps of pressing the dough blank between preheated bottom and upper molds to bring the molds to a first spacing that corresponds to a side thickness of the shaped body thereby forming a blank of the shaped body; removing the bottom and upper molds apart to a second spacing that is less than twice the side thickness thereby reducing pressure on the blank of the shaped body and pre-baking the blank of the shaped body under substantially atmospheric pressure; and after the pre-baking compressing the blank of the shaped body between the bottom and upper molds to bring the molds to the first spacing and baking the shaped body with the molds at the first spacing until it is done.

12 Claims, 2 Drawing Sheets a)

b)

c)

d)

METHOD FOR PRODUCING A BAKED SHAPED BODY

BACKGROUND OF THE INVENTION

The invention concerns a method for producing baked shaped bodies which are made of non-liquid dough by using grain flower, that is brought in as a dough blank into said pressing mold which consists of a lower and upper form, and is baked in said pressing mold.

Furthermore, the invention concerns a pressing mold for producing baked shaped bodies having a bottom mold which has the inverse shape of the under side of a shaped body and a top mold having the inverse shape of the top of the shaped body, which is laid one on top of the lower form by lying in between the dough blank, wherein the pressing mold does have steam exit orifices.

It is common knowledge that damp elasticated dough is taken into a pressing mold consisting of a bottom and an upper mold while producing waffles, pizza bases and flan cases of different types and for different usage.

In the German patent DE 28 41 398 C2 there is disclosed a method including a device for practicing the method wherein pieces of dough are widely pressed and flattened in a press consisting of a steel punch and a matrix. Sliding powers caused by the elasticity of the dough that would avoid a regular extension of the dough are overcome by an air-cushion between the dough an the steel punch. The Austrian patent AT 335 940 discloses a manually operated press apparatus that is also used for shaping the piece of dough. A method for producing a shaped dough product is known out of the U.S. Pat. No. 2,111,021. Therein the shaping is done during a continuous heat supply again by shaping plates whereby the distance between these plates during the shaping process is bigger than the thickness of the dough taking account of increasing volume caused by the heat. Finally, the U.S. Pat. No. 5,405,627 discloses a method for producing a certain pizza crust wherein a piece of dough is laid into a basic mold, a cover mold is pressed thereon and afterwards a second piece of dough is pressure-formed above the already shaped basic piece by the help of a second cover mold. The disclosed required apparatus for practicing the method has in at least one of the cover molds round terraces which are used to drill holes into the dough during the pressing procedure to reach an mutual mixing of the overlying dough masses. An exit of possibly resulting steam is not planned.

So far methods and apparatuses for shaping dough using heat supply have been come into operation the water being in the dough is evaporized by the heat energy. Thereby a product is created nearly free of remaining humidity which is suitable for processing.

Provided that the evaporizing of the water takes place under pressure it causes a wanted broken-up structure of shaped products. This product is characterized by their sensory properties i.e. the chewing feeling. One of the disadvantages of this structure is the tendency of supply of humidity which creates the loss of the sensory properties.

The above mentioned methods and apparatuses is common that they are—respecting their inventive intention—only used for products that have to be eaten immediately or as soon as possible.

By using those baking technologies are also produced shaped bodies that are mainly used for packaging in the field of fast food. These products have the described disadvantage that they are not suitable for storing or packaging of damp materials e.g. food or drinks.

The German Patent 196 46 752.7 discloses a method for producing a single-use container by using a dough made of grain flower which is also suitable for the storage of damp materials.

Thereby the dough is planned as a solid dough which consists inter alia of a grain flower mixture with a share of water of 30 to 35%. A dough blank made of this kneaded solid dough is taken into a pressing mold and baked in it. By the relatively low share of water is avoided that a strong development of steam appears in the pressing mold that would regularly cause a change of structure of the single-use container as a result of the endeavours for exit out of the pressing mold.

Though it turned out that single-use containers are to make with the above mentioned baking method that admittedly cope with the demands on a high strength and a soak resistance but only show a dissatisfying quality of the surface and low compression.

SUMMARY OF THE INVENTION

The invention is based on the problem to disclose a method and a pressing mold for producing baked shaped bodies to arrange a mass production of those shaped bodies with lower costs and to improve the quality of the forming and the surface as well as the compression.

This problem is solved by a method wherein the baking process is at least provided in three phases. The baking process demonstrates a styling phase wherein the bottom and the upper molds are brought together under preheated condition by forming of the dough blank to a blank of the shaped body and under practicing a first pressing power up to a distance that corresponds to the side thickness of the blank of the shaped body. This forming phase is followed by a pre-baking phase wherein the first pressure power is reduced or switched off by the fact the bottom and the upper molds are removed from each other with an additional distance being lower than the distance. Then the blank of the shaped body is pre-baked under nearly atmospheric pressure. Finally the baking process presents a following compression phase wherein the bottom and upper molds are brought together by practicing a second pressure power on the blank of the shaped body up to a distance that corresponds to the side thickness of the shaped body. The blank of the shaped body is baked in this position to the shaped body until it is done.

During the forming phase a blank of the shaped body is made by pressure out of the blank of dough. By the fact that the pressing mold is pre-heated a first setting of the dough material takes place so that the blank of the shaped body shows a basic keeping of its shape. In the following pre-baking phase humidity being in the dough can freely disappear whereby a destruction of material consistency, e.g. by a foaming up when baking waffles, is avoided. The following compressing baking phase causes a good structure of the surface and a high strength of the shaped body.

In comparison to traditional baking processes a high strength of the shaped body is reached by pressing the dough during the baking process.

In the pre-baking phase the most part of the humidity can disappear so that a lower steam pressure is only formed during the baking process inside the pressing mold—e.g. in comparison to baking processes of wafers already known. By that the expenditure of holding together the pressing mold can be minimized. In case of the well known baking process of wafers considerable locking arrangements are needed to overcome the steam pressure appearing there.

In a first embodiment of the method the duration of the compression phase is longer than the duration of the pre-baking phase and this one again is longer than the duration of the forming phase. By that fact is achieved that the humidity can disappear without an problems and a very good compression is caused.

In a further embodiment the second pressing power is bigger than the first one because the first pressing power serves only the forming although the second pressing power determines the strength and the quality of the surface.

In a further embodiment in the compression baking phase the baking temperature in the pressing mold is at least 160° C. to 220° C. In that case it is especially useful to choose a baking temperature from 180° C. to 190° C. The rate of finishing the baking process can be influenced by the baking temperature. It must be chosen in dependence on the form of the shaped body and on the blend colour.

It is suitable to pre-heat the pressure mold in the forming phase up to the baking temperature. By that the forming process can be increased. Thereby a change of temperature also can be avoided that would cause great hindrances in case of mass production.

An embodiment of the inventive method also serves this purpose, wherein the baking temperature is mainly kept constant in the forming, pre-baking and compression phases.

It is very appropriate to choose the complete baking time from 2 to 6 minutes. During this time it is possible to carry out a complete forming without particularly high baking temperatures or to have to work with a particularly low amount of material.

It is especially appropriate to use a dough with a liquid share of a mass proportion of nearly 30%. Thereby is guaranteed that, on the one hand the dough has got a good malleability and on the other hand the dough contains only so much humidity that can disappear without destruction during the pre-baking and compression baking phase.

In a variant of the inventive method the blank of dough is brought in the form of a tablet. Thereby an automation is enabled in a simple way and the dose is exactly fixed.

The problem is also solved by a pressing mold wherein the upper mold and the bottom molds are relatively moveable to each other and lockable during the baking process.

Thereby it is possible to carry out the three phases during the baking process.

Thereby it is appropriate that the upper mold an the bottom mold are moveable directly to each other. That way can be guaranteed that the blank of dough dos not move during the forming phase.

In another embodiment of the pressing mold is that the bottom mold and/or the upper mold are divided themselves.

Furthermore it is possible that the interstices between the bottom mold and the upper mold or between the forming part of the bottom mold and/or the upper mold are shaped also steam exit orifices.

In a suitable embodiment of the pressing mold the bottom mold as well as the upper mold are equipped with steam exit orifices.

These steam exit orifices especially serve the disappearing of humidity during the compression baking phase as the mechanic pressing pressure ought to have an effect on the shaped body in this phase and not on the steam pressure.

In a further embodiment of the inventive pressing mold the steam exit orifices are arranged in a inner area far from the margin and/or in an outer area close to the margin of the bottom mold and/or of the upper mold.

As a result it is possible to guarantee a regular steam exit without local increase of the steam pressure. The number of the steam exit orifices can be chosen as big as possible whereby on the one hand the local existence of increasing steam pressure can be reduced more and more. On the other hand it is possible to keep the steam exit orifices as small as possible what helps to lower the reduction of the quality of the surface.

In a suitable embodiment the steam exit orifices are shaped as channels in the bottom and/or in the upper mold that show a first opening in the respective inner side of the bottom and/or upper mold and a second opening outer area of the bottom and/or upper mold.

These channels enable a well directed guidance of steam. Therefore it is also possible to arrange collecting channels in the pressing mold where the single channels lead in.

In an embodiment the first opening is carried out by the fact that the respective channel is developed as a at least partly open channel to the respective inner area.

Admittedly this can lead to an impression on the surface of the shaped body. Certainly the channels can be chosen the way that their impression is brought into action purposefully as a design feature.

The invention will now be illustrated in more detail in terms of an embodiment of example.

DESCRIPTION OF THE PREFERRED EMBODIMENTS

Figure 1:
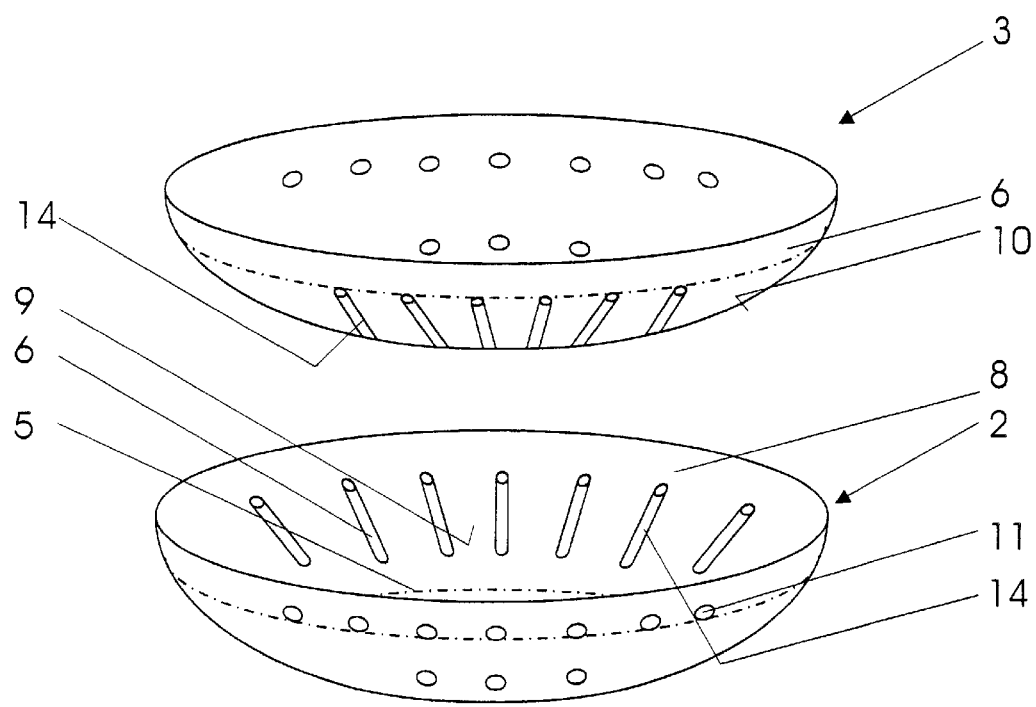
FIG. 1 a diagrammic exploded view of the inner forms of a pressing mold.

As illustrated in the drawings the inventive pressing mold 1, consist of a bottom mold 2 and an upper mold 3. The bottom mold 2 shows an inverse form of the bottom side of a shaped body 4 and the upper mold 3 shows in inverse form of the upper side of the shaped body 4. Upper mold 3 and bottom mold 2 are relatively moveable to each other and lockable during the baking process.

The bottom mold 2 as well as the upper mold 3 are equipped with steam exit orifices in a inner area 5 far from the margin as well as in an outer area 6 close to the margin of the bottom mold 2 and the upper mold 3.

These steam exit orifices are carried out as channels 7 that show a first opening 8 in the respective inners side 9 and 10 of the bottom and upper molds 2 and 3 and a second opening 11 to the respective outer side of the bottom and the upper molds 2 and 3.

Figure 2:
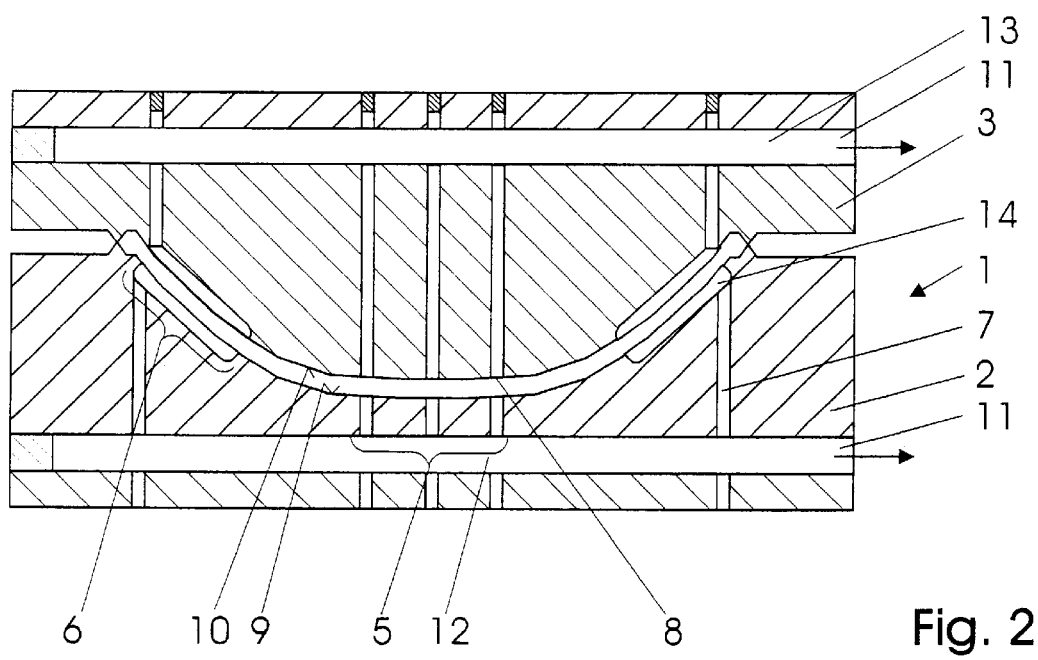
FIG. 2 a cross-section of the pressing mold.

As shown in FIG. 2 collecting channel 12 in the bottom mold 2 and a collecting channel 13 in the upper mold 3 are arranged. That have each an opening to the outside at one side of the pressing mold 1. That form at the same time the second openings 11 of the channels 7. The channels 7 of the steam exit orifices lead in these collecting channels 12 and 13, whereby the steam can get out by the help of the collecting channels 12 and 13.

The first opening 8 is carried out by the fact that the respective channel is carried out to the respective inner side 9 or 10 as an open channel 14.

Figure 3:
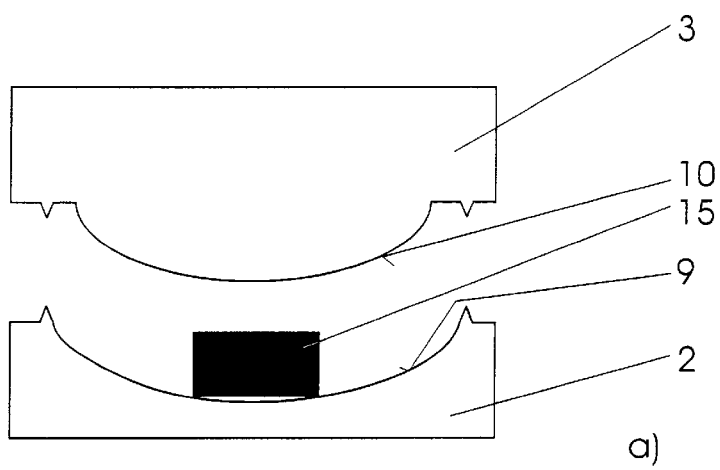
FIG. 3 a drawing of the inventive method.
Figure 3:
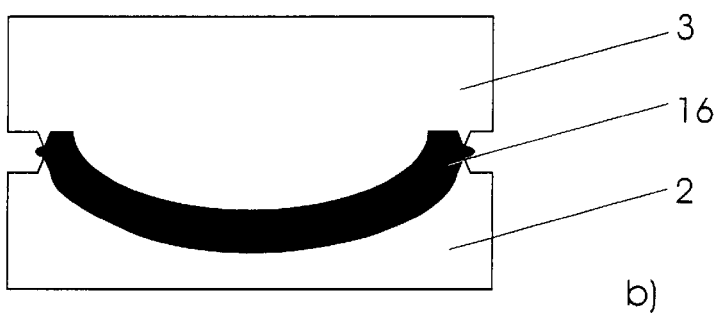
Figure 3:
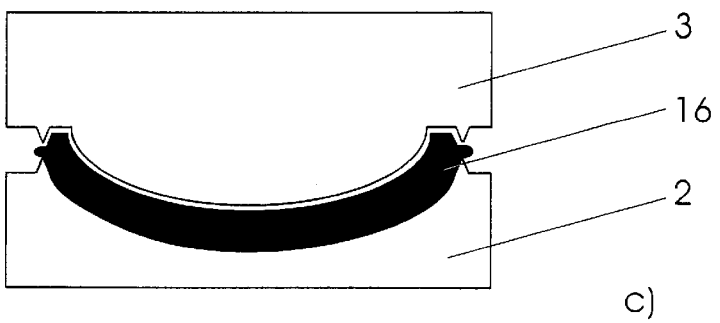
Figure 3:
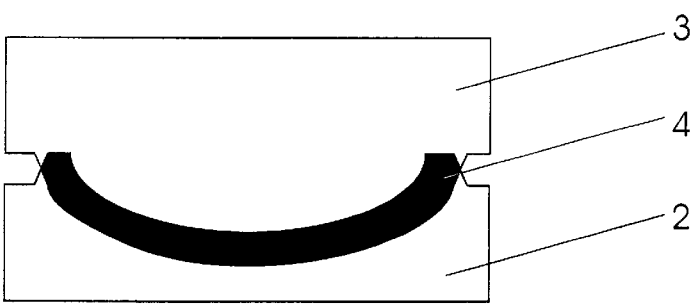

As illustrated in FIG. 3a the blank of dough 15 consisting of solid dough in form of a tablet is brought in the pressing mold 1.

In the forming phase as illustrated in FIG. 3b bottom and upper molds 2 and 3 that are heated up to the baking temperature, with the blank of dough 15 being in between under practicing of a first pressing power up to a distance which corresponds to the side thickness of the blank of the shaped body 16. That way the blank of dough 15 is transformed to a blank of a shaped body 16.

This forming phase is followed by a pre-baking phase according to FIG. 3c thereby the first pressing power is lowered or switched off while removing the bottom and the upper molds 2 and 3 from each other with an additional distance being lower than the distance. Then the blank of the shaped body 16 is pre-baked under nearly atmospheric pressure.

In the following compression phase as illustrated in FIG. 3d the bottom and the upper molds 2 and 3 are brought together by practicing a second pressure power on the blank of the shaped body 16 which is bigger than the first pressure power up to a distance corresponds to the side thickness of the shaped body 4. The blank of the shaped body 16 is baked in this position to the shaped body 4 until it is done.

METHOD AND PRESSING MOLD FOR PRODUCING A BAKED SHAPED BODIES

Reference Numbers 1 pressing mold
2 bottom mold
3 upper mold
4 shaped body
5 inner area
6 outer area
7 channel
8 first opening
9 inner side of the bottom mold
10 inner side of the upper mold
11 second opening
12 collecting channel in the bottom mold
13 collecting channel in the upper mold
14 open channel
15 blank of dough
16 blank of the shaped body

What is claimed is:

1. A method for producing a baked shaped body using a non-liquid dough blank prepared from grain flour, comprising:

pressing said dough blank between preheated bottom and upper molds to bring said molds to a first spacing that corresponds to a side thickness of the shaped body thereby forming a blank of the shaped body;

removing the bottom and upper molds apart to a second spacing that is less than twice said side thickness thereby reducing pressure on said blank of the shaped body and pre-baking said blank of the shaped body under substantially atmospheric pressure; and after said pre-baking compressing said blank of the shaped body between said bottom and upper molds to bring said molds to said first spacing and baking said shaped body with said molds at said first spacing until it is done.

2. The method as specified in claim 1 wherein said compression and baking has a duration longer than a duration of said pre-baking and wherein said duration of said pre-baking is longer than a duration of said pressing.

3. The method as specified in claim 1 wherein a greater force is exerted during said compressing than during said pressing.

4. The method as specified in claim 1 wherein said baking is at a temperature between 160° C. and 220° C.

5. The method as specified in claim 4 wherein said baking temperature is between 180° C. and 190° C.

6. The method as specified in claim 1 wherein said preheated molds are preheated to a baking temperature.

7. The method a specified in claim 6 wherein said pre-baking and said baking are at said baking temperature.

8. The method as specified in claim 1 wherein said pre-baking and baking have a combined duration of 2 to 6 minutes.

9. The method as specified in claim 1 wherein said dough is about 30% liquid by weight.

10. The method ad specified in claim 1 wherein said dough blank is formed as a tablet.

11. The method as specified in claim 1 wherein said pre-baking includes venting steam from said body through vents in said molds.

12. The method as specified in claim 1 wherein said bottom mold and said upper mold are brought together along a linear path.

* * * * *